(12) United States Patent
Dudar

(10) Patent No.: US 11,708,780 B1
(45) Date of Patent: Jul. 25, 2023

(54) SYSTEMS AND METHODS FOR EXHAUST SYSTEM

(71) Applicant: Ford Global Technologies, LLC, Dearborn, MI (US)

(72) Inventor: Aed Dudar, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/660,563

(22) Filed: Apr. 25, 2022

(51) Int. Cl.
| | |
|---|---|
| *F01N 3/36* | (2006.01) |
| *F01N 3/20* | (2006.01) |
| *B60K 15/035* | (2006.01) |
| *B01D 53/86* | (2006.01) |
| *F02D 41/02* | (2006.01) |
| *B60K 15/03* | (2006.01) |

(52) U.S. Cl.
CPC ............. *F01N 3/36* (2013.01); *B01D 53/864* (2013.01); *B60K 15/03504* (2013.01); *B60K 15/03519* (2013.01); *F01N 3/2013* (2013.01); *F02D 41/021* (2013.01); *B60K 2015/0358* (2013.01); *B60K 2015/03256* (2013.01)

(58) Field of Classification Search
CPC ........... F02M 25/0836; F02M 25/0872; F02M 2025/0845
See application file for complete search history.

(56) References Cited

U.S. PATENT DOCUMENTS

| | | | |
|---|---|---|---|
| 6,279,547 B1 | 8/2001 | Mancini et al. | |
| 6,910,467 B2* | 6/2005 | Murakami | F02M 25/08 123/383 |
| 7,575,410 B2* | 8/2009 | Uchida | F01N 3/36 415/36 |
| 8,447,495 B2 | 5/2013 | Pearce et al. | |
| 9,216,646 B2 | 12/2015 | Yang et al. | |
| 9,457,651 B2 | 10/2016 | Lindlbauer et al. | |
| 9,644,552 B2 | 5/2017 | Dudar | |
| 9,850,832 B2 | 12/2017 | Dudar | |
| 9,932,944 B2 | 4/2018 | Yang et al. | |
| 10,746,135 B2 | 8/2020 | Dudar | |
| 11,261,770 B1* | 3/2022 | Delleree | F01N 3/2013 |
| 11,498,101 B1* | 11/2022 | Dudar | B08B 9/0328 |
| 2005/0016505 A1* | 1/2005 | Everingham | F02M 25/0836 123/520 |
| 2015/0158377 A1 | 6/2015 | Dudar et al. | |
| 2018/0238492 A1* | 8/2018 | Johnson | B60K 15/03006 |
| 2019/0293031 A1* | 9/2019 | Dudar | F01N 3/2006 |

OTHER PUBLICATIONS

Geldhäuser, S., "Vitesco Technologies Wins Major Order From European Vehicle Manufacturer," Vitesco Technologies Website, Available Online at https://www.vitesco-technologies.com/getmedia/f8c0ff44-aeda-4a1d-a783-2fc59e1f3cff/200312_PR_Vitesco-T_EMITEC_EN.pdf, Available as Early as Mar. 12, 2020, 3 pages.

* cited by examiner

*Primary Examiner* — Anthony Ayala Delgado
(74) *Attorney, Agent, or Firm* — Vincent Mastrogiacomo; McCoy Russell LLP

(57) ABSTRACT

Methods and systems are provided for a fuel system. In one example, a method includes flowing fuel tank vapors to a catalyst during a fuel tank depressurization in response to a refueling request. The method further includes executing an engine vapor flush following a refueling event being completed.

19 Claims, 4 Drawing Sheets

SYSTEMS AND METHODS FOR EXHAUST SYSTEM

FIELD

The present description relates generally to methods and systems for reducing evaporative emissions.

BACKGROUND/SUMMARY

Vehicle emission control systems may be configured to store refueling vapors, running-loss vapors, and diurnal emissions in a fuel vapor canister, and then purge the stored vapors during a subsequent engine operation. The stored vapors may be routed to engine intake for combustion, further improving fuel economy for the vehicle. In a typical canister purge operation, a canister purge valve coupled between the engine intake and the fuel vapor canister is opened, allowing for intake manifold vacuum to be applied to the fuel vapor canister. Fresh air may be drawn through the fuel vapor canister via an open canister vent valve. This configuration facilitates desorption of stored fuel vapors from the adsorbent material in the canister, regenerating the adsorbent material for further fuel vapor adsorption.

However, engine run time in hybrid electric vehicles (HEVs) and plug-in hybrid vehicles may be limited, and thus opportunities for purging fuel vapor from the canister may also be limited. If the vehicle is refueled, saturating the canister with fuel vapor, and then parked in a hot, sunny location prior to a purge event, the canister may desorb fuel vapors as it warms up, leading to bleed emissions. For vehicles that vent the fuel tank during a vehicle-off condition, the volatization of fuel under similar conditions may overwhelm the capacity of the fuel vapor canister. Additionally, under certain conditions, a fuel vapor canister saturated with fuel vapor may desorb fuel vapors during vehicle operation under conditions where the vehicle is being solely powered by a battery. Furthermore, limited engine run times in hybrid and plug-in hybrid vehicles may result in exhaust catalyst temperatures dropping below the light-off range for vehicles relying on exhaust heat to increase the temperature of the catalyst, thus resulting in increased exhaust emissions.

In one example, the issues described above may be addressed by a method including adjusting a refueling vapor valve (RVV) to an open position in response to a refueling request being present, wherein the refueling vapor valve couples a fuel tank to an exhaust manifold. In this way, fuel tank vapors may be treated by a catalyst during a depressurization thereof.

As one example, a conduit couples a fuel tank head space to a fuel tank isolation valve (FTIV) and the RVV. The FTIV may be commanded closed in response to a refueling request, which blocks vapor flow to a canister and forces vapors to flow to the exhaust manifold as the fuel tank depressurizes. A fuel cap may be opened to allow a user to refuel the car once the tank is depressurized, while the vapors in the exhaust manifold may be treated in the catalyst. By doing this, the canister is not saturated with vapors that may lead to desorption therefrom in response to conditions.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 1:
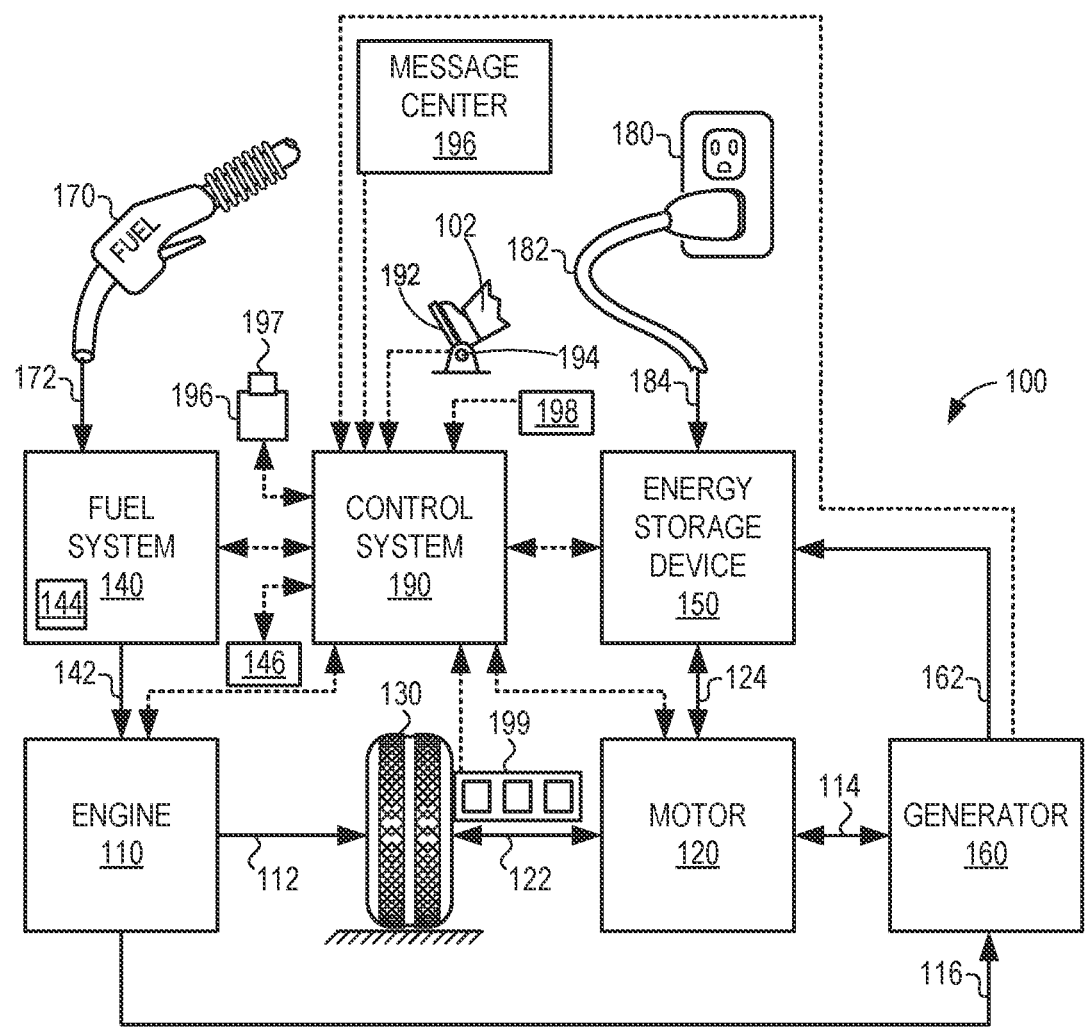
FIG. 1 schematically shows an example vehicle propulsion system.
Figure 2:
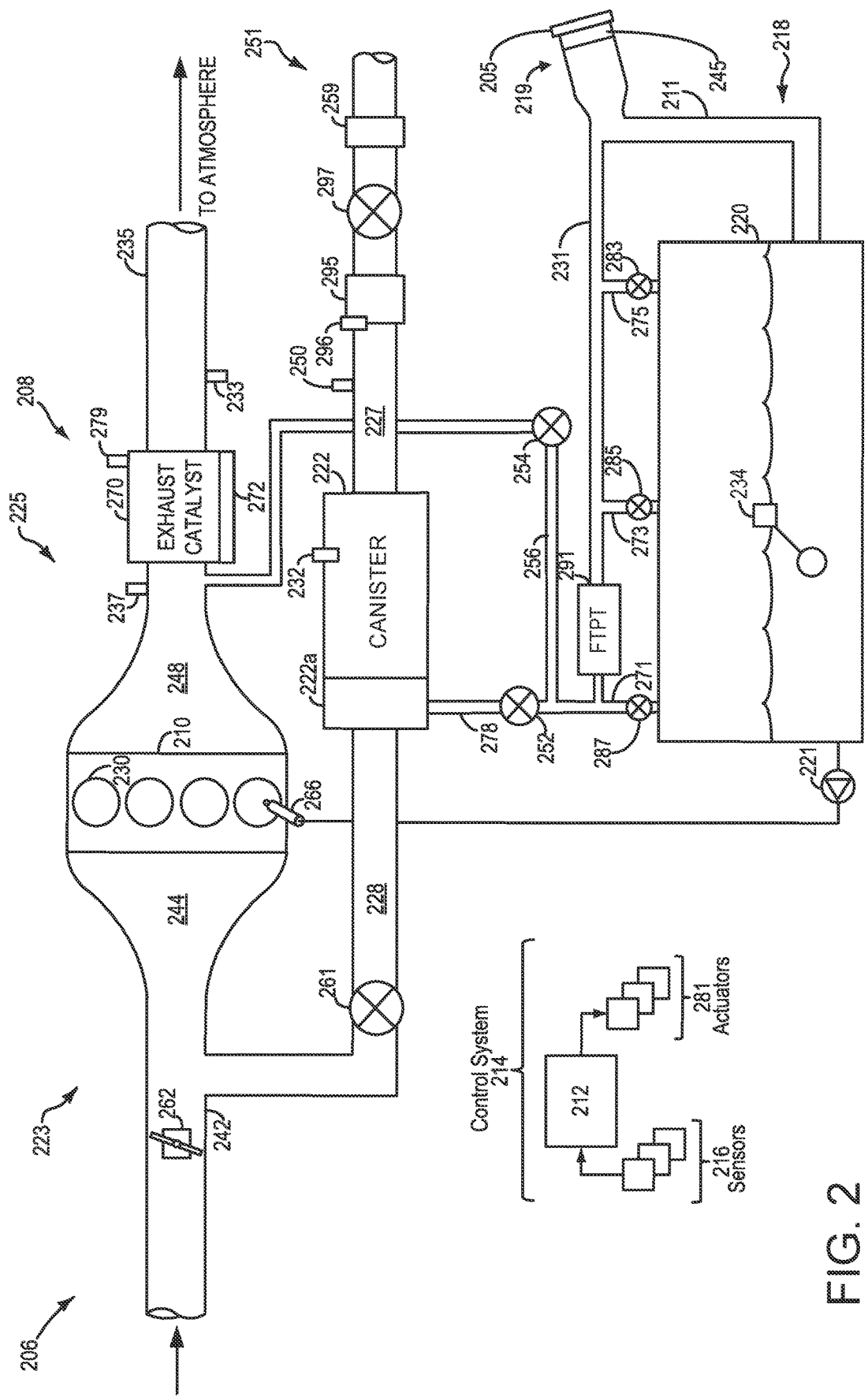
FIG. 2 schematically shows an example vehicle system with a fuel system and an evaporative emissions system.
Figure 3:
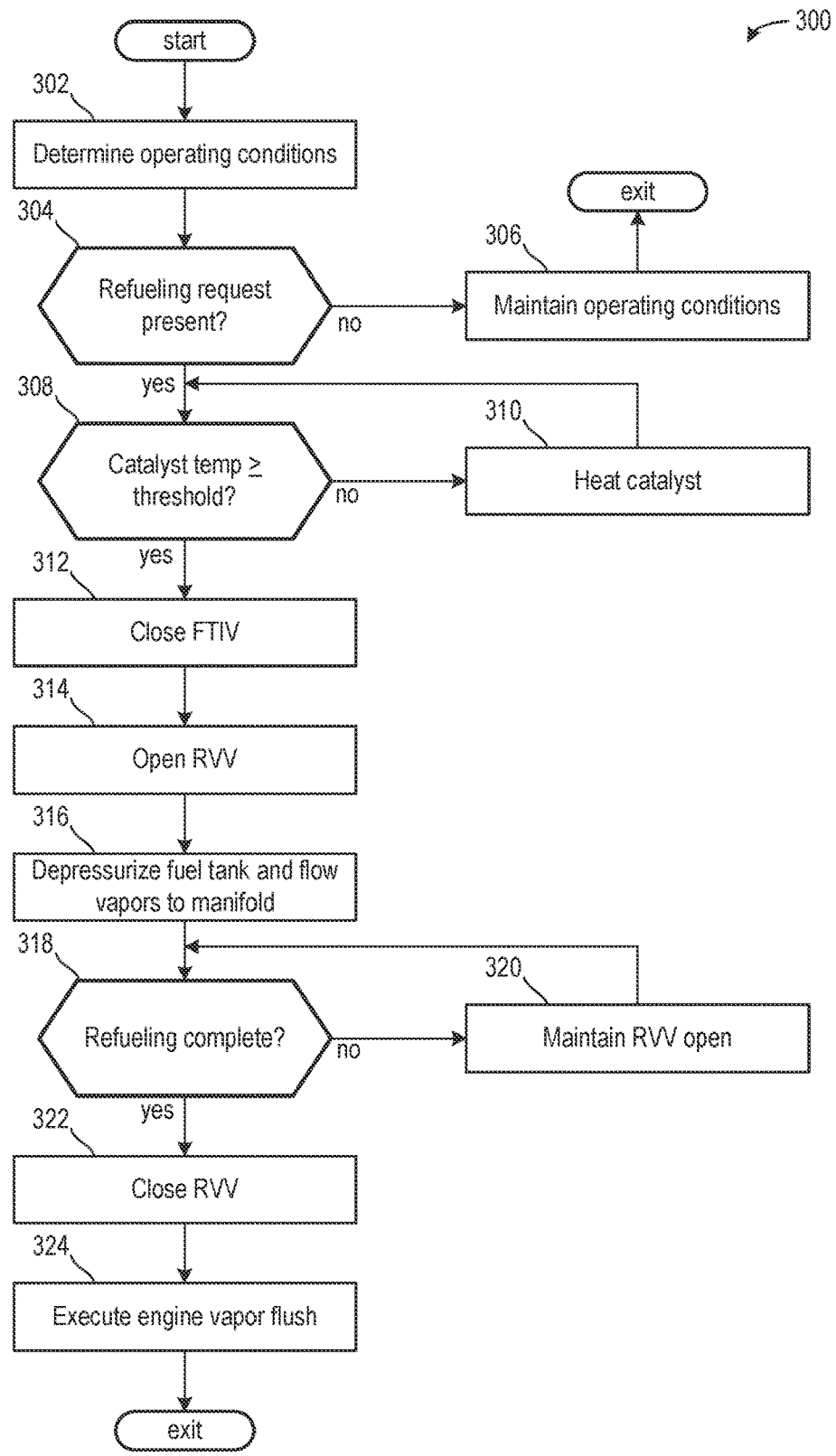
FIG. 3 shows a method for operating a fuel system in response to a refueling request being present.
Figure 4:
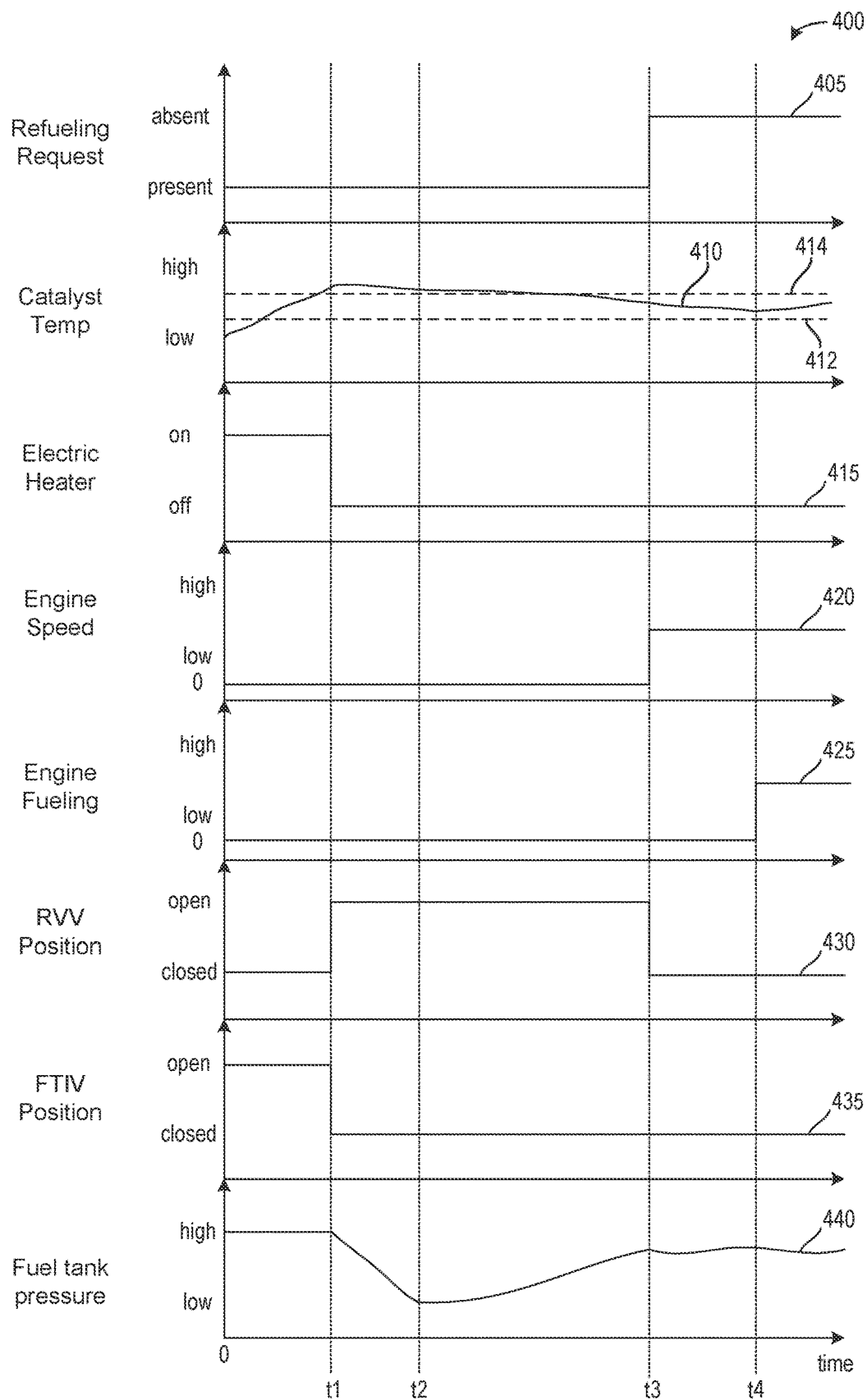
FIG. 4 shows an engine operating sequence illustrating changes to engine and fuel system conditions in response to a refueling request.

The following description relates to systems and methods for a fuel system. The fuel system may be arranged in an engine system, as illustrated in FIGS. 1 and 2. The fuel system may include a refueling vapor valve (RVV) configured to depressurize a fuel tank by flowing fuel vapors therefrom to an exhaust manifold coupled to an engine and a catalyst. A method of operating the RVV in response to a refueling request being present is shown in FIG. 3. A plot illustrating fuel system and engine conditions during a refueling event is shown in FIG. 4.

FIG. 1 illustrates an example vehicle propulsion system 100. Vehicle propulsion system 100 includes a fuel burning engine 110 and a motor 120. As a non-limiting example, engine 110 comprises an internal combustion engine and motor 120 comprises an electric motor. Motor 120 may be configured to utilize or consume a different energy source than engine 110. For example, engine 110 may consume a liquid fuel (e.g., gasoline) to produce an engine output while motor 120 may consume electrical energy to produce a motor output. As such, a vehicle with propulsion system 100 may be referred to as a hybrid electric vehicle (HEV).

Vehicle propulsion system 100 may utilize a variety of different operational modes depending on operating conditions encountered by the vehicle propulsion system. Some of these modes may enable engine 110 to be maintained in an off state (i.e. set to a deactivated state) where combustion of fuel at the engine is discontinued. For example, under select operating conditions, motor 120 may propel the vehicle via drive wheel 130 as indicated by arrow 122 while engine 110 is deactivated.

During other operating conditions, engine 110 may be set to a deactivated state (as described above) while motor 120 may be operated to charge energy storage device 150. For example, motor 120 may receive wheel torque from drive wheel 130 as indicated by arrow 122 where the motor may convert the kinetic energy of the vehicle to electrical energy for storage at energy storage device 150 as indicated by arrow 124. This operation may be referred to as regenerative braking of the vehicle. Thus, motor 120 can provide a generator function in some embodiments. However, in other embodiments, generator 160 may instead receive wheel torque from drive wheel 130, where the generator may convert the kinetic energy of the vehicle to electrical energy for storage at energy storage device 150 as indicated by arrow 162.

During still other operating conditions, engine 110 may be operated by combusting fuel received from fuel system 140 as indicated by arrow 142. For example, engine 110 may be operated to propel the vehicle via drive wheel 130 as indicated by arrow 112 while motor 120 is deactivated. During other operating conditions, both engine 110 and motor 120 may each be operated to propel the vehicle via drive wheel 130 as indicated by arrows 112 and 122, respectively. A configuration where both the engine and the motor may selectively propel the vehicle may be referred to as a parallel type vehicle propulsion system. Note that in some embodiments, motor 120 may propel the vehicle via a first set of drive wheels and engine 110 may propel the vehicle via a second set of drive wheels.

In other embodiments, vehicle propulsion system 100 may be configured as a series type vehicle propulsion system, whereby the engine does not directly propel the drive wheels. Rather, engine 110 may be operated to power motor 120, which may in turn propel the vehicle via drive wheel 130 as indicated by arrow 122. For example, during select operating conditions, engine 110 may drive generator 160 as indicated by arrow 116, which may in turn supply electrical energy to one or more of motor 120 as indicated by arrow 114 or energy storage device 150 as indicated by arrow 162. As another example, engine 110 may be operated to drive motor 120 which may in turn provide a generator function to convert the engine output to electrical energy, where the electrical energy may be stored at energy storage device 150 for later use by the motor.

Fuel system 140 may include one or more fuel storage tanks 144 for storing fuel on-board the vehicle. For example, fuel tank 144 may store one or more liquid fuels, including but not limited to: gasoline, diesel, and alcohol fuels. In some examples, the fuel may be stored on-board the vehicle as a blend of two or more different fuels. For example, fuel tank 144 may be configured to store a blend of gasoline and ethanol (e.g., E10, E85, etc.) or a blend of gasoline and methanol (e.g., M10, M85, etc.), whereby these fuels or fuel blends may be delivered to engine 110 as indicated by arrow 142. Still other suitable fuels or fuel blends may be supplied to engine 110, where they may be combusted at the engine to produce an engine output. The engine output may be utilized to propel the vehicle as indicated by arrow 112 or to recharge energy storage device 150 via motor 120 or generator 160.

In some embodiments, energy storage device 150 may be configured to store electrical energy that may be supplied to other electrical loads residing on-board the vehicle (other than the motor), including cabin heating and air conditioning, engine starting, headlights, cabin audio and video systems, etc. As a non-limiting example, energy storage device 150 may include one or more batteries and/or capacitors.

Control system 190 may communicate with one or more of engine 110, motor 120, fuel system 140, energy storage device 150, and generator 160. Control system 190 may receive sensory feedback information from one or more of engine 110, motor 120, fuel system 140, energy storage device 150, and generator 160. Further, control system 190 may send control signals to one or more of engine 110, motor 120, fuel system 140, energy storage device 150, and generator 160 responsive to this sensory feedback. Control system 190 may receive an indication of an operator requested output of the vehicle propulsion system from a vehicle operator 102. For example, control system 190 may receive sensory feedback from pedal position sensor 194 which communicates with pedal 192. Pedal 192 may refer schematically to a brake pedal and/or an accelerator pedal.

Energy storage device 150 may periodically receive electrical energy from a power source 180 residing external to the vehicle (e.g., not part of the vehicle) as indicated by arrow 184. As a non-limiting example, vehicle propulsion system 100 may be configured as a plug-in hybrid electric vehicle (HEV), whereby electrical energy may be supplied to energy storage device 150 from power source 180 via an electrical energy transmission cable 182. During a recharging operation of energy storage device 150 from power source 180, electrical transmission cable 182 may electrically couple energy storage device 150 and power source 180. While the vehicle propulsion system is operated to propel the vehicle, electrical transmission cable 182 may disconnect between power source 180 and energy storage device 150. Control system 190 may identify and/or control the amount of electrical energy stored at the energy storage device, which may be referred to as the state of charge (SOC).

In other embodiments, electrical transmission cable 182 may be omitted, where electrical energy may be received wirelessly at energy storage device 150 from power source 180. For example, energy storage device 150 may receive electrical energy from power source 180 via one or more of electromagnetic induction, radio waves, and electromagnetic resonance. As such, it should be appreciated that any suitable approach may be used for recharging energy storage device 150 from a power source that does not comprise part of the vehicle. In this way, motor 120 may propel the vehicle by utilizing an energy source other than the fuel utilized by engine 110.

Fuel system 140 may periodically receive fuel from a fuel source residing external to the vehicle. As a non-limiting example, vehicle propulsion system 100 may be refueled by receiving fuel via a fuel dispensing device 170 as indicated by arrow 172. In some embodiments, fuel tank 144 may be configured to store the fuel received from fuel dispensing device 170 until it is supplied to engine 110 for combustion. In some embodiments, control system 190 may receive an indication of the level of fuel stored at fuel tank 144 via a fuel level sensor. The level of fuel stored at fuel tank 144 (e.g., as identified by the fuel level sensor) may be communicated to the vehicle operator, for example, via a fuel gauge or indication in a vehicle instrument panel 196.

The vehicle propulsion system 100 may also include an ambient temperature/humidity sensor 198, and a roll stability control sensor, such as a lateral and/or longitudinal and/or yaw rate sensor(s) 199. The vehicle instrument panel 196 may include indicator light(s) and/or a text-based display in which messages are displayed to an operator. The vehicle instrument panel 196 may also include various input portions for receiving an operator input, such as buttons, touch screens, voice input/recognition, etc. For example, the vehicle instrument panel 196 may include a refueling button 197 which may be manually actuated or pressed by a vehicle operator to initiate refueling. For example, in response to the vehicle operator actuating refueling button 197, a fuel tank in the vehicle may be depressurized so that refueling may be performed.

In an alternative embodiment, the vehicle instrument panel 196 may communicate audio messages to the operator without display. Further, the sensor(s) 199 may include a vertical accelerometer to indicate road roughness. These devices may be connected to control system 190. In one example, the control system may adjust engine output and/or the wheel brakes to increase vehicle stability in response to sensor(s) 199.

FIG. 2 shows a schematic depiction of a vehicle system 206. The vehicle system 206 includes an engine system 208 coupled to an emissions control system 251 and a fuel system 218. Emission control system 251 includes a fuel vapor container or canister 222 which may be used to capture and store fuel vapors. In some examples, vehicle system 206 may be a hybrid electric vehicle system. In one example, the vehicle system 206 is a plug-in hybrid electric vehicle (PHEV). In another example, the vehicle system 206 includes only the engine system 208 for transferring power to wheels of the vehicle.

The engine system 208 may include an engine 210 having a plurality of cylinders 230. The engine 210 includes an engine intake 223 and an engine exhaust 225. The engine intake 223 includes a throttle 262 fluidly coupled to the engine intake manifold 244 via an intake passage 242. The engine exhaust 225 includes an exhaust manifold 248 leading to an exhaust passage 235 that routes exhaust gas to the atmosphere. The engine exhaust 225 may include one or more exhaust catalyst 270, which may be mounted in a close-coupled position in the exhaust. Exhaust catalyst may include a temperature sensor 279. In some examples one or more emission control devices may include a three-way catalyst, lean NOx trap, diesel particulate filter, oxidation catalyst, etc. It will be appreciated that other components may be included in the engine such as a variety of valves and sensors.

In some examples, additionally or alternatively, the catalyst 270 may include a heater 272. Heater 272 may be an electric heater in one example. The heater 272 may be configured to increase a temperature of the catalyst 270 in response to conditions. In one example, the heater 272 may be activated following a prolonged duration of engine inactivity where the catalyst temperature may fall below a light-off temperature. It may be desired to increase the catalyst temperature above the light-off temperature during conditions where emissions treatment is desired, such as during a refueling event as described herein.

Fuel system 218 may include a fuel tank 220 coupled to a fuel pump system 221. The fuel pump system 221 may include one or more pumps for pressurizing fuel delivered to the injectors of engine 210, such as the example injector 266 shown. While only a single injector 266 is shown, additional injectors are provided for each cylinder. It will be appreciated that fuel system 218 may be a return-less fuel system, a return fuel system, or various other types of fuel system. Fuel tank 220 may hold a plurality of fuel blends, including fuel with a range of alcohol concentrations, such as various gasoline-ethanol blends, including E10, E85, gasoline, etc., and combinations thereof. A fuel level sensor 234 located in fuel tank 220 may provide an indication of the fuel level ("Fuel Level Input") to controller 212. As depicted, fuel level sensor 234 may comprise a float connected to a variable resistor. Alternatively, other types of fuel level sensors may be used.

Vapors generated in fuel system 218 may be routed to an evaporative emissions control system 251 which includes a fuel vapor canister 222 via vapor recovery line 231, before being purged to the engine intake 223. Vapor recovery line 231 may be coupled to fuel tank 220 via one or more conduits and may include one or more valves for isolating the fuel tank during certain conditions. For example, vapor recovery line 231 may be coupled to fuel tank 220 via one or more or a combination of conduits 271, 273, and 275.

Further, in some examples, one or more fuel tank vent valves in conduits 271, 273, or 275. Among other functions, fuel tank vent valves may allow a fuel vapor canister of the emissions control system to be maintained at a low pressure or vacuum without increasing the fuel evaporation rate from the tank (which would otherwise occur if the fuel tank pressure were lowered). For example, conduit 271 may include a grade vent valve (GVV) 287, conduit 273 may include a fill limit venting valve (FLVV) 285, and conduit 275 may include a grade vent valve (GVV) 283. Further, in some examples, recovery line 231 may be coupled to a fuel filler system 219. In some examples, fuel filler system may include a fuel cap 205 for sealing off the fuel filler system from the atmosphere. Refueling system 219 is coupled to fuel tank 220 via a fuel filler pipe or neck 211.

Further, refueling system 219 may include refueling lock 245. In some embodiments, refueling lock 245 may be a fuel cap locking mechanism. The fuel cap locking mechanism may be configured to automatically lock the fuel cap in a closed position so that the fuel cap cannot be opened. For example, the fuel cap 205 may remain locked via refueling lock 245 while pressure or vacuum in the fuel tank is greater than a threshold. In response to a refuel request, e.g., a vehicle operator initiated request, the fuel tank may be depressurized and the fuel cap unlocked after the pressure or vacuum in the fuel tank falls below a threshold. A fuel cap locking mechanism may be a latch or clutch, which, when engaged, prevents the removal of the fuel cap. The latch or clutch may be electrically locked, for example, by a solenoid, or may be mechanically locked, for example, by a pressure diaphragm.

In some embodiments, refueling lock 245 may be a filler pipe valve located at a mouth of fuel filler pipe 211. In such embodiments, refueling lock 245 may not prevent the removal of fuel cap 205. Rather, refueling lock 245 may prevent the insertion of a refueling pump into fuel filler pipe 211. The filler pipe valve may be electrically locked, for example by a solenoid, or mechanically locked, for example by a pressure diaphragm.

In some embodiments, refueling lock 245 may be a refueling door lock, such as a latch or a clutch which locks a refueling door located in a body panel of the vehicle. The refueling door lock may be electrically locked, for example by a solenoid, or mechanically locked, for example by a pressure diaphragm.

In embodiments where refueling lock 245 is locked using an electrical mechanism, refueling lock 245 may be unlocked by commands from controller 212, for example, when a fuel tank pressure decreases below a pressure threshold. In embodiments where refueling lock 245 is locked using a mechanical mechanism, refueling lock 245 may be unlocked via a pressure gradient, for example, when a fuel tank pressure decreases to atmospheric pressure.

Emissions control system 251 may include one or more emissions control devices, such as one or more fuel vapor canisters 222 filled with an appropriate adsorbent, the canisters are configured to temporarily trap fuel vapors (including vaporized hydrocarbons) during fuel tank refilling operations, "running loss" (that is, fuel vaporized during vehicle operation), and diurnal cycles. In one example, the adsorbent used is activated charcoal. Emissions control system 251 may further include a canister ventilation path or vent line 227 which may route gases out of the canister 222 to the atmosphere when storing, or trapping, fuel vapors from fuel system 218.

Canister 222 may include a buffer 222a (or buffer region), each of the canister and the buffer comprising the adsorbent.

As shown, the volume of buffer 222a may be smaller than (e.g., a fraction of) the volume of canister 222. The adsorbent in the buffer 222a may be same as, or different from, the adsorbent in the canister (e.g., both may include charcoal). Buffer 222a may be positioned within canister 222 such that during canister loading, fuel tank vapors are first adsorbed within the buffer, and then when the buffer is saturated, further fuel tank vapors are adsorbed in the canister. In comparison, during canister purging, fuel vapors are first desorbed from the canister (e.g., to a threshold amount) before being desorbed from the buffer. In other words, loading and unloading of the buffer is not linear with the loading and unloading of the canister. As such, the effect of the canister buffer is to dampen any fuel vapor spikes flowing from the fuel tank to the canister, thereby reducing the possibility of any fuel vapor spikes going to the engine. One or more temperature sensors 232 may be coupled to and/or within canister 222. As fuel vapor is adsorbed by the adsorbent in the canister, heat is generated (heat of adsorption). Likewise, as fuel vapor is desorbed by the adsorbent in the canister, heat is consumed. In this way, the adsorption and desorption of fuel vapor by the canister may be monitored and estimated based on temperature changes within the canister.

Vent line 227 may also allow fresh air to be drawn into canister 222 when purging stored fuel vapors from fuel system 218 to engine intake 223 via purge line 228 and purge valve 261. For example, purge valve 261 may be normally closed but may be opened during certain conditions so that vacuum from engine intake manifold 244 is provided to the fuel vapor canister for purging. In some examples, vent line 227 may include an air filter 259 disposed therein upstream of a canister 222.

In some examples, the flow of air and vapors between canister 222 and the atmosphere may be regulated by a canister vent valve (CVV) 297 coupled within vent line 227. When included, the canister vent valve may be a normally open valve, so that fuel tank isolation valve 252 (FTIV) may control venting of fuel tank 220 with the atmosphere. FTIV 252 may be positioned between the fuel tank and the fuel vapor canister within conduit 278. FTIV 252 may be a normally closed valve, that when opened, allows for the venting of fuel vapors from fuel tank 220 to canister 222. Fuel vapors may then be vented to atmosphere, or purged to engine intake system 223 via canister purge valve 261.

Conduit 271 may bifurcate and couple to each of conduit 278 and conduit 256. A refueling vapor valve (RVV) 254 may be arranged in the conduit 256. The RVV 254 may be configured to control fuel vapor flow from the fuel tank 220 to the exhaust manifold 248. As such, the conduit 256 in combination with the conduit 271 may fluidly couple a head space of the fuel tank 220 to the exhaust manifold 248. The RVV 254 may be actuated via an actuator configured to receive signals/commands from the controller 212. In one example, the position of the RVV 254 is adjusted during a refueling event, wherein the adjusting occurs following determination of a catalyst temperature being greater than or equal to a threshold temperature. Additionally or alternatively, the fuel cap 205 may be maintained sealed until the catalyst temperature is greater than or equal to the threshold temperature during the refueling event.

In one example, the vehicle system 206 may include where the canister 222 is sized for storing fuel vapors during only a fuel leak diagnostic event. As such, a size of the canister 222 may be reduced relative to other canisters since vapors expelled from the fuel tank during depressurization are treated in the catalyst 270. By doing this, a manufacturing cost and packaging size of the vehicle system 206 may be reduced while also decrease emissions due to vapor desorption from the canister 222 due to ambient conditions. In one example, the canister 222 is less than 50%, or less than 70%, or less than 95% a size of other canisters used in fuel systems.

Fuel system 218 may be operated by controller 212 in a plurality of modes by selective adjustment of the various valves and solenoids. For example, the fuel system may be operated in a fuel vapor storage mode (e.g., during a fuel tank refueling operation and with the engine not running), wherein the controller 212 may open isolation valve 252 while closing canister purge valve (CPV) 261 to direct refueling vapors into canister 222 while preventing fuel vapors from being directed into the intake manifold.

As another example, the fuel system may be operated in a refueling mode (e.g., when fuel tank refueling is requested by a vehicle operator), wherein the controller 212 may close FTIV 252, while opening RVV 254 once the catalyst temperature is greater than or equal to the threshold temperature, to depressurize the fuel tank before allowing enabling fuel to be added therein. As such, FTIV 252 may be kept closed during the refueling operation to block refueling vapors from the canister and to force the vapors to flow to the catalyst 270, where the vapors may be treated. After refueling is completed, the RVV 254 may be closed. In one example, the engine 210 may be operated unfueled for a threshold duration to clear refueling vapors therefrom. The vapors may flow to the catalyst 270 and treated therein. The refueling mode is described in greater detail with respect to FIG. 3.

To detect breakthrough, emission control system 251 may include a hydrocarbon sensor 250 positioned in the canister vent line 227 coupling the canister 222 and the atmosphere, and may provide an indication of hydrocarbon breakthrough from the canister to the atmosphere during conditions when the vehicle is off and the canister is not purging. In other examples, hydrocarbon sensor 250 may provide an indication of an ambient hydrocarbon amount in the atmosphere.

Controller 212 may comprise a portion of a control system 214. Control system 214 is shown receiving information from a plurality of sensors 216 (various examples of which are described herein) and sending control signals to a plurality of actuators 281 (various examples of which are described herein). As one example, sensors 216 may include exhaust gas sensor 237 located upstream of the emission control device, temperature sensor 233, pressure sensor 291 (fuel tank pressure transducer), and canister temperature sensor 232. Other sensors such as pressure, temperature, air/fuel ratio, and composition sensors may be coupled to various locations in the vehicle system 206. As another example, the actuators may include fuel injector 266, throttle 262, fuel tank isolation valve 252, CPV 261 and refueling lock 245. The controller 212 may receive input data from the various sensors, process the input data, and trigger the actuators in response to the processed input data based on instruction or code programmed therein corresponding to one or more routines.

Leak detection routines may be intermittently performed by controller 212 on fuel system 218 to confirm that the fuel system is not degraded. As such, leak detection routines may be performed while the engine is off (engine-off leak test) using engine-off natural vacuum (EONV) generated due to a change in temperature and pressure at the fuel tank following engine shutdown and/or with vacuum supplemented from a vacuum pump. Alternatively, leak detection routines may be performed while the engine is running by operating a vacuum pump and/or using engine intake manifold vacuum. Leak tests may be performed by an evaporative leak check module (ELCM) 295 communicatively coupled to controller 212. ELCM 295 may be coupled in vent 227, between canister 222 and the atmosphere. ELCM 295 may include a vacuum pump for applying negative pressure to the fuel system when administering a leak test. In some embodiments, the vacuum pump may be configured to be reversible. In other words, the vacuum pump may be configured to apply either a negative pressure or a positive pressure on the fuel system. ELCM 295 may further include a reference orifice and a pressure sensor 296. Following the applying of vacuum to the fuel system, a change in pressure at the reference orifice (e.g., an absolute change or a rate of change) may be monitored and compared to a threshold. Based on the comparison, a fuel system leak may be diagnosed.

In some configurations, a canister vent valve (CVV) 297 may be coupled within vent line 227. CVV 297 may function to adjust a flow of air and vapors between canister 222 and the atmosphere. The CVV may also be used for diagnostic routines. When included, the CVV may be opened during fuel vapor storing operations (for example, during fuel tank refueling and while the engine is not running) so that air, stripped of fuel vapor after having passed through the canister, can be pushed out to the atmosphere. Likewise, during purging operations (for example, during canister regeneration and while the engine is running), the CVV may be opened to allow a flow of fresh air to strip the fuel vapors stored in the canister. In some examples, CVV 297 may be a solenoid valve wherein opening or closing of the valve is performed via actuation of a canister vent solenoid. In particular, the canister vent valve may be a default open valve that is closed upon actuation of the canister vent solenoid. In some examples, CVV 297 may be configured as a latchable solenoid valve. In other words, when the valve is placed in a closed configuration, it latches closed without requiring additional current or voltage. For example, the valve may be closed with a 100 ms pulse, and then opened at a later time point with another 100 ms pulse. In this way, the amount of battery power required to maintain the CVV closed is reduced. In particular, the CVV may be closed while the vehicle is off, thus maintaining battery power while maintaining the fuel emissions control system sealed from atmosphere.

FIGS. 1-2 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. It will be appreciated that one or more components referred to as being "substantially similar and/or identical" differ from one another according to manufacturing tolerances (e.g., within 1-5% deviation).

Turning now to FIG. 3, it shows a method 300 for depressurizing a fuel tank in response to a refueling request being present. Instructions for carrying out method 300 may be executed by a controller based on instructions stored on a memory of the controller and in conjunction with signals received from sensors of the engine system, such as the sensors described above with reference to FIG. 1. The controller may employ engine actuators of the engine system to adjust engine operation, according to the methods described below.

The method 300 may begin at 302, which may include determining, estimating, and/or measuring current operating conditions. Current operating conditions may include, but are not limited to, one or more of a throttle position, a manifold pressure, an engine temperature, an engine speed, a catalyst temperature, and an air/fuel ratio.

At 304, the method 300 may include determining if a refueling request is present. The refueling request may be signaled by a user via a button in a vehicle cabin, a fuel cap being pressed, or in response to a vehicle being located at a refueling station.

If the refueling request is not present, then the method 300 may proceed to 306, which may include maintaining operating conditions. Conditions for allowing a refueling event may not be executed, such as depressurizing a fuel tank.

If the refueling request is present, then at 308, the method 300 may include determining if a catalyst temperature is greater than or equal to a threshold refueling temperature. In one example, the threshold refueling temperature is equal to a light-off temperature of the catalyst. In another example, the threshold refueling temperature may be equal to a temperature above the light-off temperature, wherein the temperature accounts for a temperature decay of the catalyst during the refueling event so that the electric heater is not reactivated. In one example, the threshold refueling temperature may be a dynamic value based on an estimated duration of the refueling event, which may be proportional to a fuel level to begin the refueling event. If the catalyst temperature is not greater than or equal to the threshold refueling temperature (e.g., less than the threshold refueling temperature, then at 310, the method 300 may include heating the catalyst. Heating the catalyst may include activating to an electric heater of the catalyst. By activating the electric heater, the catalyst temperature may increase.

If the catalyst temperature is greater than or equal to the threshold refueling temperature, then at 312, the method 300 may include closing the FTIV. As such, vapors from the fuel tank may not flow to a canister and/or an intake manifold.

At 314, the method 300 may include opening the refueling vapor valve (RVV). The refueling vapor valve may direct fuel vapors from the fuel tank directly to the exhaust manifold.

At 316, the method 300 may include depressurizing the fuel tank and flowing the vapors to the exhaust manifold. A portion of the vapors may flow to the heated catalyst, wherein the catalyst may oxidize the hydrocarbons to $CO_2$ and water. A remaining portion of the vapors may flow to the engine. In one example, the portion is greater than the remaining portion. In some examples, exhaust valves of the engine may be actuated to closed positions to block exhaust gases from entering the engine. Once the catalyst is heated and the fuel tank is depressurized, the fuel cap may be unlocked and the fuel may be delivered to the fuel tank.

At 318, the method 300 may include determining if refueling is complete. Refueling may be complete if a fuel level of the fuel tank is equal to a threshold fuel level. The threshold fuel level may be equal to a determined fuel volume of the fuel tank that provides a desired amount of fuel vapor head space therein. Additionally or alternatively, refueling may be complete if fuel is no longer flowing into the fuel tank. In one example, a fuel dispensing nozzle may stop dispensing fuel in response to a price limit or a volume request being met, the price limit or the volume request set by the user.

If the refueling is not complete, then at 320, the method 300 may include maintaining the RVV open and continuing to flow vapors to the catalyst. Refueling vapors may flow to the catalyst and continue to be treated therein. If the refueling is complete, then at 322, the method 300 may include closing the RVV. As such, the fuel tank may be sealed from the exhaust manifold.

At 324, the method 300 may include executing an engine vapor flush. Executing the engine vapor flush may include spinning the engine unfueled for a threshold duration following closure of the RVV. The engine may be cranked via an electrically powered motor. The threshold duration may be equal to a number of crank angles to evacuate vapors from the engine. In one example, the threshold duration may be a dynamic value based on an amount of vapors flowing to the exhaust manifold. In another example, the threshold duration may be equal to a fixed value based on a volume of the engine cylinders.

Turning now to FIG. 4, it shows a plot 400 illustrating an operating sequence including changes to conditions to depressurize a fuel tank in response to a refueling request being present. Plot 405 illustrates a presence or an absence of a refueling request. Plot 410 illustrates a catalyst temperature, dashed line 412 illustrates a light-off temperature, and dashed line 414 illustrates a threshold refueling temperature. Plot 415 illustrates a state of an electric heater. Plot 420 illustrates an engine speed. Plot 425 illustrates an engine fueling. Plot 430 illustrates a position of the RVV. Plot 435 illustrates a position of the FTIV. Plot 440 illustrates a fuel tank pressure. Time increases from a left to a right side of the figure.

Prior to t1, the refueling request is present (plot 405). The catalyst temperature (plot 410) is less than each of the light-off temperature (dashed line 412) and the threshold refueling temperature (dashed line 414). Thus, the electric heater is activated (plot 415) to increase the catalyst temperature. At t1, the catalyst temperature is greater than the threshold refueling temperature. As illustrated, the threshold refueling temperature is greater than the light-off temperature. In one example, the catalyst temperature may be increased to the threshold refueling temperature to account for a temperature decay during the refueling event. The electric heater is deactivated. In response to the catalyst temperature being greater than the threshold refueling temperature, the FTIV is commanded to a closed position (if the previous position was an open position), as shown by plot 435. Following the FTIV being commanded to the closed position, the RVV is commanded to an open position (plot 430).

Additionally or alternatively, the electric heater may heat the catalyst to the light-off temperature, wherein the electric heater may be reactivated during the refueling event if the catalyst temperature falls below the light-off temperature.

Between t1 and t2, the fuel tank is fluidly coupled to the exhaust manifold and begins to depressurize (plot 440). At t2, the fuel begins to enter the fuel tank. Between t2 and t3, the fuel tank pressure increases as fuel continues to flow therein. The catalyst temperature decreases but remains lit-off as fuel vapors from the fuel tank are treated therein.

At t3, the refueling event is complete and the refueling request is absent. The RVV is commanded to a closed position and the fuel tank is sealed from the exhaust manifold. Between t3 and t4, the engine speed increases during execution of the engine vapor flush. The engine remains unfueled during the engine vapor flush and the engine is spun via an electric motor. The catalyst temperature continues to decrease as the catalyst treats vapors expelled from the engine.

At t4, the engine vapor flush is complete. Following t4, the engine is fueled and the catalyst temperature increases.

In this way, a canister size and fuel vapor escape during a refueling event may be reduced. The technical effect of fluidly coupling the fuel tank to an electrically heated catalyst is to treat the fuel vapors during the depressurization prior to opening the fuel cap. By doing this, the canister may be sized for leak detection diagnostic purposes only, which may correspond 5-10% of the size of a previous canister in a fuel system without the RVV, thereby decreasing manufacturing costs and packaging constraints.

The disclosure provides support for a method including adjusting a refueling vapor valve (RVV) to an open position in response to a refueling request being present, wherein the refueling vapor valve couples a fuel tank to an exhaust manifold. A first example of the method further includes heating a catalyst to a threshold refueling temperature via an electric heater prior to adjusting the RVV in response to the refueling request being present. A second example of the method, optionally including the first example, further includes adjusting a fuel tank isolation valve (FTIV) to a closed position prior to adjusting the RVV in response to the refueling request being present. A third example of the method, optionally including one or more of the previous examples, further includes adjusting the RVV to a closed position in response to the refueling request being absent. A fourth example of the method, optionally including one or more of the previous examples, further includes spinning an engine unfueled for a threshold duration. A fifth example of the method, optionally including one or more of the previous examples, further includes flowing fuel vapors from the fuel tank, through the RVV in the open position, to the exhaust manifold during a refueling event, wherein a catalyst is closed-coupled to the exhaust manifold.

The disclosure further provides support for a system for a hybrid vehicle including an engine coupled to an exhaust manifold, a catalyst arranged directly downstream of the exhaust manifold, the catalyst coupled to a heater, a refueling vapor valve (RVV) configured to control vapor flow from a fuel tank to the exhaust manifold, and a controller comprising computer-readable instructions stored on memory thereof that when executed enable the controller to heat the catalyst via the heater in response to a catalyst temperature being less than a threshold temperature when a refueling request is present, adjust a position of the RVV to an open position in response to the catalyst temperature being greater than or equal to the threshold temperature, and open a fuel cap. A first example of the system further includes where the instructions further enable the controller to adjust a positon of a fuel tank isolation valve (FTIV) to a closed position prior to adjusting the position of the RVV to the open position. A second example of the system, optionally including the first example, further includes where the instructions further enable the controller to adjust the position of the RVV to a closed position following completion of a refueling event. A third example of the system, optionally including one or more of the previous examples, further includes where the instructions further enable the controller to rotate the engine unfueled following completion of the refueling event. A fourth example of the system, optionally including one or more of the previous examples, further includes where the engine is rotated unfueled for a threshold duration. A fifth example of the system, optionally including one or more of the previous examples, further includes where the RVV is arranged in a passage coupled to a conduit coupled head space of the fuel tank, the passage further coupled to the exhaust manifold. A sixth example of the system, optionally including one or more of the previous examples, further includes where a fuel tank isolation valve (FTIV) is arranged in the conduit. A seventh example of the system, optionally including one or more of the previous examples, further includes where the heater is an electric heater. An eighth example of the system, optionally including one or more of the previous examples, further includes where the hybrid vehicle is a plug-in hybrid vehicle.

The disclosure further provides support for a method for a fuel system of a vehicle including blocking fuel tank vapor flow to a canister of the fuel system via actuating a fuel tank isolation valve (FTIV) and flowing fuel tank vapors to an exhaust manifold via actuating a refueling vapor valve (RVV) during a refueling event. A first example of the method further includes blocking fuel tank vapor flow to the exhaust manifold following completion of the refueling event. A second example of the method, optionally including the first example, further includes executing an engine vapor flush, the engine vapor flush comprising operating an engine unfueled after completion of the refueling event for a threshold duration. A third example of the method, optionally including one or more of the previous examples, further includes where the blocking is executed in response to a refueling request being present. A fourth example of the method, optionally including one or more of the previous examples, further includes where a conduit coupled to a head space of the fuel tank bifurcates to the FTIV and the RVV.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising:
adjusting a refueling vapor valve (RVV) to an open position in response to a refueling request being present, wherein the refueling vapor valve couples a fuel tank to an exhaust manifold; and
adjusting a fuel tank isolation valve (FTIV) to a closed position prior to adjusting the RVV in response to the refueling request being present.

2. The method of claim 1, further comprising heating a catalyst to a threshold refueling temperature via an electric heater prior to adjusting the RVV in response to the refueling request being present.

3. The method of claim 1, further comprising adjusting the RVV to a closed position in response to the refueling request being absent.

4. The method of claim 3, further comprising spinning an engine unfueled for a threshold duration.

5. The method of claim 1, further comprising flowing fuel vapors from the fuel tank, through the RVV in the open position, to the exhaust manifold during a refueling event, wherein a catalyst is closed-coupled to the exhaust manifold.

6. A system for a hybrid vehicle, comprising:
an engine coupled to an exhaust manifold;
a catalyst arranged directly downstream of the exhaust manifold, the catalyst coupled to a heater;
a refueling vapor valve (RVV) configured to control vapor flow from a fuel tank to the exhaust manifold; and a controller comprising computer-readable instructions stored on memory thereof that when executed enable the controller to:
heat the catalyst via the heater in response to a catalyst temperature being less than a threshold temperature when a refueling request is present;
adjust a position of the RVV to an open position in response to the catalyst temperature being greater than or equal to the threshold temperature; and
unlock a fuel cap.

7. The system of claim 6, wherein the instructions further enable the controller to adjust a positon of a fuel tank isolation valve (FTIV) to a closed position prior to adjusting the position of the RVV to the open position.

8. The system of claim 6, wherein the instructions further enable the controller to adjust the position of the RVV to a closed position following completion of a refueling event.

9. The system of claim 8, further comprising where the instructions further enable the controller to rotate the engine unfueled following completion of the refueling event.

10. The system of claim 9, wherein the engine is rotated unfueled for a threshold duration.

11. The system of claim 6, wherein the RVV is arranged in a passage coupled to a conduit coupled head space of the fuel tank, the passage further coupled to the exhaust manifold.

12. The system of claim 11, wherein a fuel tank isolation valve (FTIV) is arranged in the conduit.

13. The system of claim 6, wherein the heater is an electric heater.

14. The system of claim 6, wherein the hybrid vehicle is a plug-in hybrid vehicle.

15. A method for a fuel system of a vehicle, comprising:
blocking fuel tank vapor flow to a canister of the fuel system via actuating a fuel tank isolation valve (FTIV); and
flowing fuel tank vapors to an exhaust manifold via actuating a refueling vapor valve (RVV) during a refueling event.

16. The method of claim 15, further comprising blocking fuel tank vapor flow to the exhaust manifold following completion of the refueling event.

17. The method of claim 16, further comprising executing an engine vapor flush, the engine vapor flush comprising operating an engine unfueled after completion of the refueling event for a threshold duration.

18. The method of claim 15, wherein the blocking is executed in response to a refueling request being present.

19. The method of claim 15, wherein a conduit coupled to a head space of the fuel tank bifurcates to the FTIV and the RVV.

* * * * *